United States Patent
Kumar et al.

(10) Patent No.: US 10,430,179 B1
(45) Date of Patent: Oct. 1, 2019

(54) METHODS AND SYSTEMS FOR MANAGING APPLICATION CONFIGURATIONS

(71) Applicant: Capital One Services, LLC, McLean, VA (US)

(72) Inventors: Lokesh Vijay Kumar, Frisco, TX (US); Poornima Bagare Raju, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/295,892

(22) Filed: Mar. 7, 2019

(51) Int. Cl.
    *G06F 9/44* (2018.01)
    *G06F 8/65* (2018.01)
    *G06F 8/71* (2018.01)
    *G06F 11/36* (2006.01)

(52) U.S. Cl.
    CPC .................. *G06F 8/65* (2013.01); *G06F 8/71* (2013.01); *G06F 11/3616* (2013.01); *G06F 11/3664* (2013.01)

(58) Field of Classification Search
    CPC .......... G06F 8/65; G06F 11/3664; G06F 8/71; G06F 11/3616
    See application file for complete search history.

(56) References Cited

U.S. PATENT DOCUMENTS

| | | | | |
|---|---|---|---|---|
| 8,875,091 B1* | 10/2014 | Rouleau | ................... | G06F 8/10 717/101 |
| 2005/0071838 A1* | 3/2005 | Hatasaki | ................... | G06F 8/64 717/168 |
| 2010/0146481 A1* | 6/2010 | Binder | ................... | G06F 8/656 717/110 |
| 2015/0040104 A1* | 2/2015 | Mall | ................... | H04L 41/082 717/121 |
| 2015/0378720 A1* | 12/2015 | Gondek | ................... | G06F 19/00 717/120 |
| 2016/0246594 A1* | 8/2016 | Shoavi | ................... | G06F 8/71 |
| 2017/0090898 A1* | 3/2017 | Branson | ................... | G06F 8/65 |
| 2017/0139725 A1* | 5/2017 | Koufogiannakis | ................... | G06F 9/44505 |
| 2018/0157481 A1* | 6/2018 | Zessin | ................... | H04L 63/00 |

* cited by examiner

*Primary Examiner* — Adam Lee
(74) *Attorney, Agent, or Firm* — DLA Piper LLP (US)

(57) ABSTRACT

In one aspect, the present disclosure relates to a method for managing a configuration of an application. A property of an application to update may be identified. A request to update the property to a change management process can be sent. The property of the application can be updated in a test environment. A test of the application with the updated property in the test environment can be identified as successful, and the request can be identified as approved. The property of the application can be updated in a database. A notification can be sent over a network to a computer system executing the application, where the notification causes the application to refresh the property by replacing the property with the updated property from the database without restarting or recreating the application.

20 Claims, 6 Drawing Sheets

METHODS AND SYSTEMS FOR MANAGING APPLICATION CONFIGURATIONS

FIELD

The present disclosure relates generally to managing application configurations.

BACKGROUND

If there is an issue with a property of an application, current solutions may require that a change management process be completed and then shut down the application so that it may be totally recreated so that the changes in the configuration file can be read to update the properties. Thus, there is a need to update applications in a more streamlined and efficient manner.

SUMMARY

According to one aspect, the present disclosure relates to a computer-implemented method for managing a configuration of an application, including: identifying a property of an application to update; sending a request to update the property to a change management process; causing the property of the application to be updated in a test environment; identifying that a test of the application with the updated property in the test environment was successful, and that the request was approved; causing the property of the application to be updated in a database after identifying that the test was successful and that the request was approved; and triggering a notification to be sent over a network to a computer system executing the application, the notification causing the application to refresh the property by replacing the property with the updated property from the database without restarting or recreating the application.

According to another aspect of the present disclosure, a system is provided for managing a configuration of an application, including: a first computer system configured to: identify a property of an application to update, send a request to update the property to a change management process, cause the property of the application to be updated in a database after identifying that the request was approved, and trigger a notification to be sent over a network; a second computer system different from the first computer system, configured to: execute the application, and refresh the property of the application by replacing the property with the updated property from the database without restarting or recreating the application, in response to receiving the notification over the network; and a third computer system different from the first and second computer systems, configured to: receive the request to update the property of the application, implement the change management process, and send an indication to the first computer system when the request has been approved.

According to another aspect of the present disclosure, a system is provided that manages a configuration of an application, including: a memory storing instructions; and a processor that, when executing the instructions, is configured to: identify a property of an application to update, send a request to update the property to a change management process, identify that the request was approved, cause the property of the application to be updated in a database after identifying that the request was approved, and trigger a notification to be sent over a network to a computer system executing the application, the notification causing the application to refresh the property by replacing the property with the updated property from the database without restarting or recreating the application.

According to another aspect, the present disclosure relates to causing information about properties of a new application to be stored in the database in response to receiving a request to register the new application.

According to another aspect, the present disclosure relates to a notification being sent, in some embodiments from a first computer system to a second computer system, over the network via an enterprise bus.

According to another aspect, the present disclosure relates to a first computer system triggering the notification to be sent over the network to a computer system executing the application, and the change management process being implemented in a second computer system different from the first computer system.

According to another aspect, the present disclosure relates to a first computer system triggering a notification to be sent over a network to a computer system executing the application, and automatically causing, by a second computer system, the notification to be sent over the network to the first computer system in response to identifying that the test was successful and that the request was approved.

According to another aspect of the present disclosure, a system is provided where the database is stored in the second computer system. In another aspect, the database is stored in a fourth computer system, the fourth computer system being different from the first, second, and third computer systems. In yet another aspect, a system is provided where a fifth computer system tests the application with the updated property, the fifth computer system being different from the first, second, third, and fourth computer systems.

According to another aspect of the present disclosure, the notification includes an address to the updated property, and the second computer system is further configured to retrieve the updated property from the database over the network based on the address.

According to another aspect of the present disclosure, the processor is further configured to present an indicator that a test of the application with the updated property was successful and to present an indicator that the request was approved, for display to an administrator.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Embodiments of the present disclosure may: 1) identify application properties as configuration items; 2) register and identify applications; or 3) allow the system to have asynchronous communication with all the applications that are registered; or any combination thereof. Application properties can be persisted, instead of, for example, loading properties of an application on application start-up or when the application is refreshed. In this way, it may only take a new request to update or create a new or revised property on an application instance so that an entire application stack may not need to be restarted and/or recreated.

Using the systems and processes described herein, application property changes in production may not need to follow tedious management and change processes to get new instances up and running. Furthermore, externalizing application properties can help ensure that application properties are refreshed only when a command is issued and when it is needed. Unwanted refresh and reloads of properties may be prevented.

Figure 1:
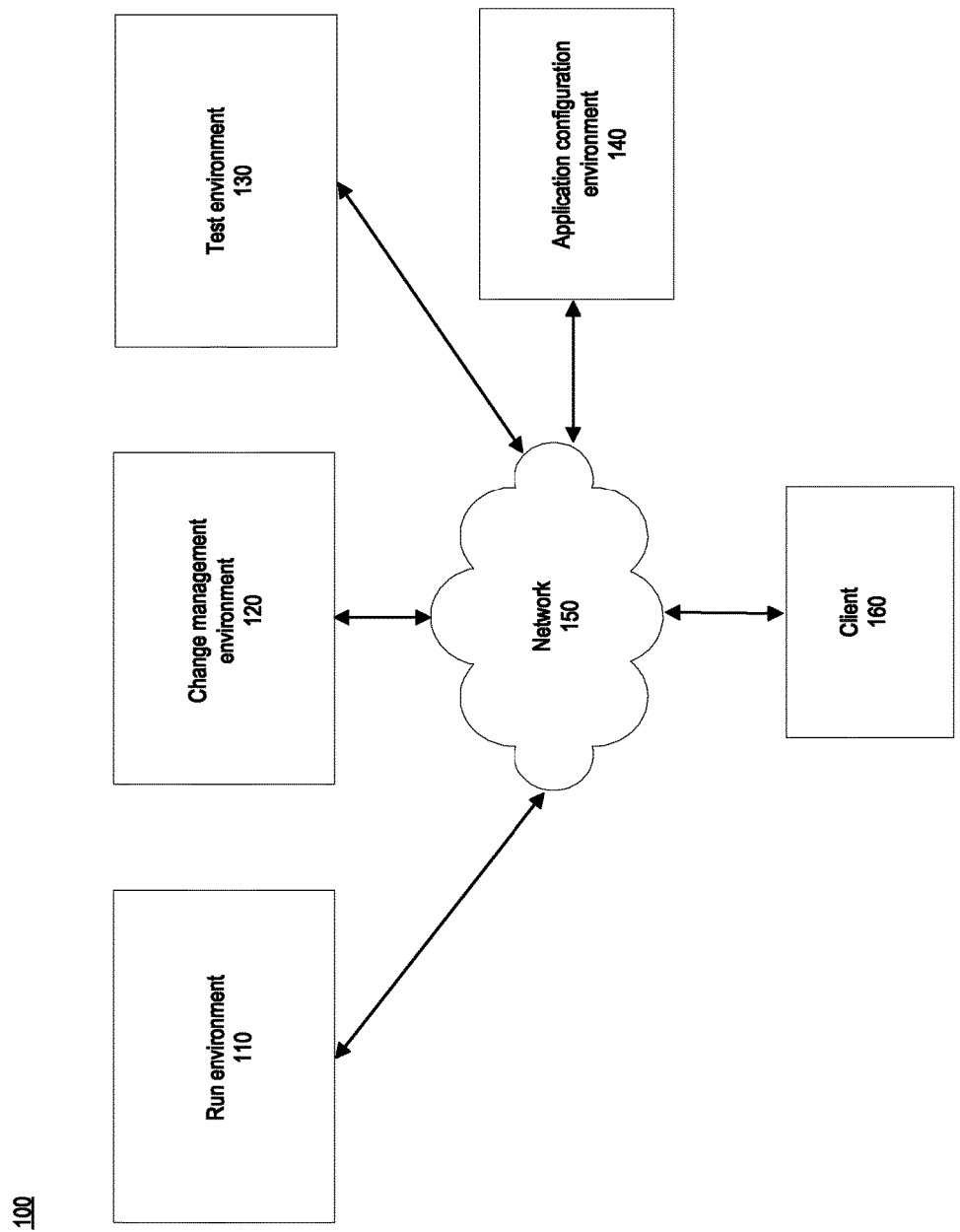
FIG. 1 is a diagram of an illustrative system 100 for managing configurations of applications, according to some embodiments of the present disclosure.

FIG. 1 is a diagram of an illustrative system 100 for managing configurations of applications, according to some embodiments of the present disclosure. Applications can be registered on this system. Every time an application property for a registered application needs an update, a new request can be created to send a command to the application to refresh its property.

For example, as shown in FIG. 1, a client 160 can access (e.g., over a network 150) properties for an application in an application configuration environment 140. A run environment 110 can cause the application to retrieve an updated property from the database over the network. A change management environment 120 can receive a request to change (e.g., update or add) a property for the application. A test environment 130 can allow the property of the application to be changed (e.g., updated or added) and tested.

Figure 2:
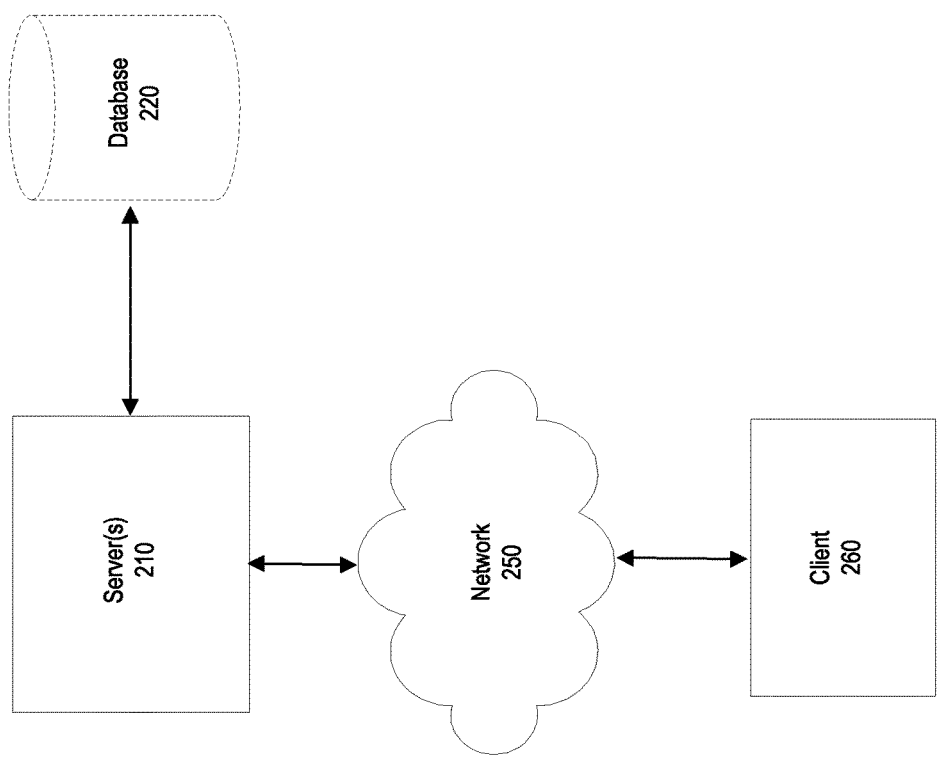
FIG. 2 is a diagram of an illustrative system 200 for managing a configuration of an application, according to some embodiments of the present disclosure.

FIG. 2 is a diagram of an illustrative system 200 for managing a configuration of an application, according to some embodiments of the present disclosure. A client 200 can communicate (e.g., thru a network 250) with a server 210. The server 210 can communicate with a database 220. In some embodiments, information about properties of a new application can be stored and/or updated in the database. (This can be done, for example, in response to receiving a request to register a new application.) Example options of saving properties include the following: 1) Having applications read new configurations from persistence storage on command from the application configuration environment 140. (With this approach, an external service may need to update the existing property, so that the application can pick up the new changes.) 2) A centralized properties storage can be kept for all applications (the application configuration environment 140 can itself store all properties) and trigger an application property refresh command for applications.

Figure 3:
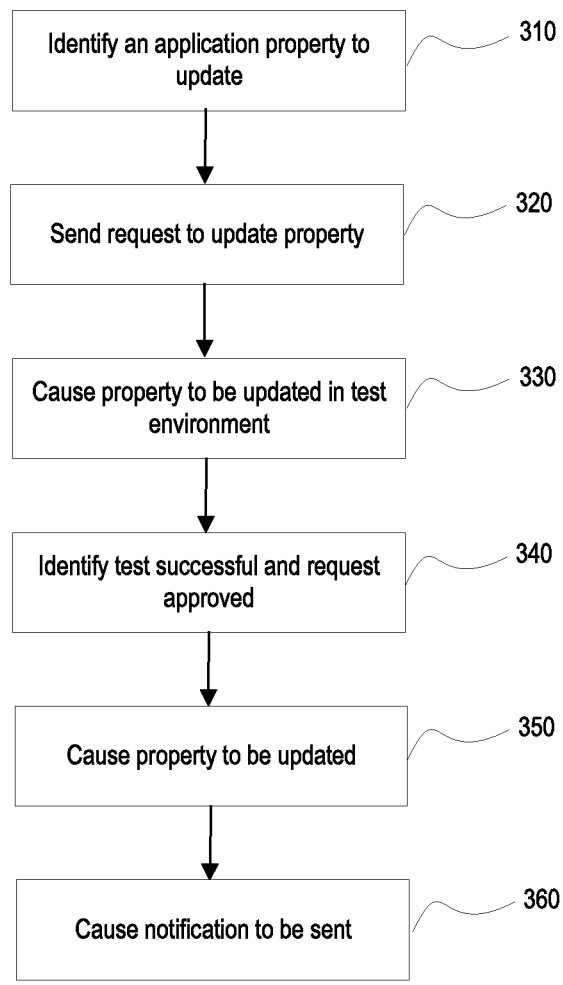
FIG. 3 is a flow diagram showing processing that may occur within the systems of FIGS. 1 and 2, according to some embodiments of the present disclosure.

FIG. 3 is a flow diagram showing processing that may occur within the systems of FIGS. 1 and 2, according to some embodiments of the present disclosure. In 310, a property of an application to update can be identified. In 320, a request to change (e.g., update or add) the property can be sent to a change management environment 120. In 330, the property of the application can be updated in a test environment 130. In 340, a test of the application with the updated property completed in the test environment 130 can be identified as successful, and the request can be approved. In 350, the property of the application can be updated in a database after identifying that the test was successful and that the request was approved. In 360, a notification can be sent (e.g., automatically) over a network (e.g., via an enterprise bus) to a computer system executing the application in response to identifying that a test of the application with the updated property was successful and that the request was approved. The notification can cause the application to refresh the property by replacing the property with the updated property from the database without restarting or recreating the application. The notification can include an address to the updated property, and the notification can cause the application to retrieve the updated property from the database over the network based on the address.

Figure 4:
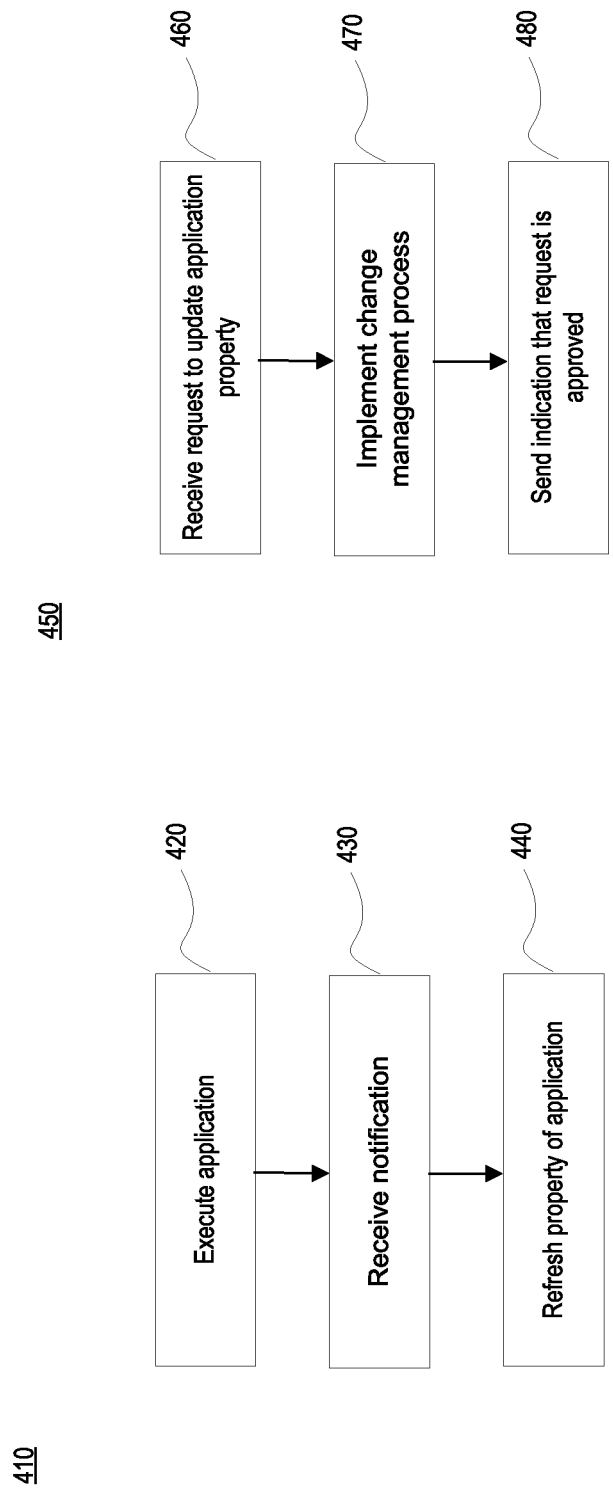
FIGS. 4A and 4B are the flow diagrams showing how the update and approval processes may occur separately, according to some embodiments of the present disclosure.

FIGS. 4A and 4B are the flow diagrams showing how the update and approval processes may occur separately, according to some embodiments of the present disclosure. In 410, an application can be updated. In 420, the application can be executed. In 430, a notification can be received. In 440, the property of the application can be refreshed. In 450, an update can be approved. In 460, a request to update an application property can be received. In 470, the change management process can be implemented. For example, a request to update the property can be sent over the network to the change management environment 120. In 480, an indication that a request is approved can be sent.

Figure 5:
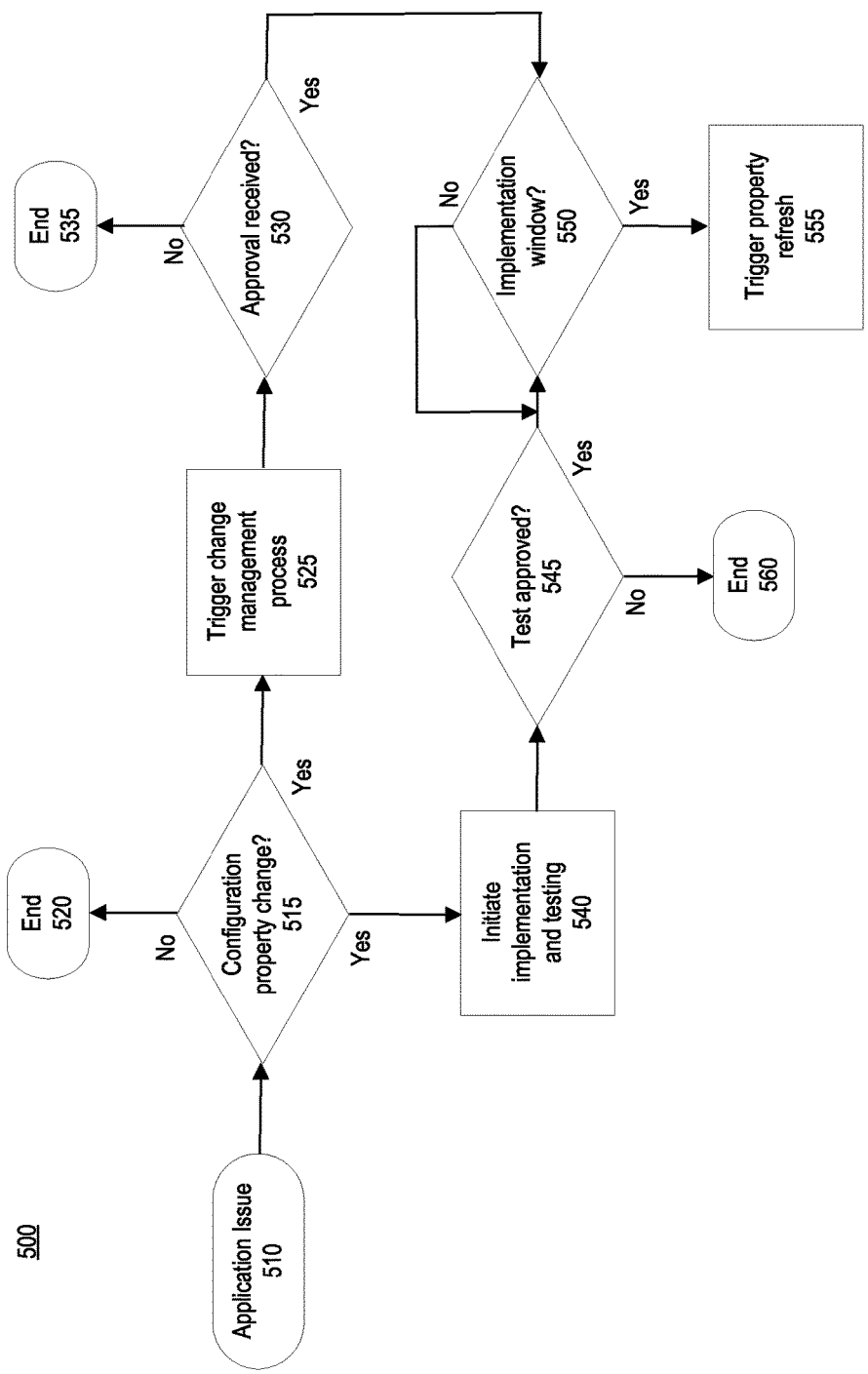
FIG. 5 is a flow diagram 500 showing processing that may occur within the systems of FIGS. 1 and 2, according to some embodiments of the present disclosure.

FIG. 5 is a flow diagram 500 showing processing that may occur within the systems of FIGS. 1 and 2, according to some embodiments of the present disclosure. In 510, an application issue can be identified. In 515, it can be determined if the change is a property configuration change. If no, in 520 the process can end. If yes, in 525 the change management process can be triggered. In 530, it can be determined if approval for the change is approved. If no, the process can end in 530.

In 540, implementation and testing can be initiated. In 545, it can be determined if the test was approved. If no, in 560 the process can end. If yes, in 550, it can be determined if it is the implementation window. If no, 550 can be repeated. If yes, in 555 the property refresh can be triggered.

As shown in FIG. 5, the approval and update processes can happen separately in some embodiments. In addition, in some embodiments, an indicator can be displayed to an administrator indicating that a request was approved and/or a test of the application with the updated property was successful.

As explained throughout this disclosure the disclosed systems and processes can: 1) identify application properties as configuration items; 2) register and identify applications; or 3) communicate (e.g., asynchronously) with all the applications that are registered; or any combination thereof. Applicant restarts and refreshes can be avoided or minimized. In addition, the system can be notified when a properties file for an application needs to be changed or refreshed.

In some embodiments, if a team builds an application, the application can be registered and the properties can be identified as configuration items and stored. If the system breaks down, the system can be notified that it needs to recover by reading a certain property file. New extensions may not be needed. All that may be needed is a notification to the system. If the application breaks the next day (e.g., because something was wrongly configured in a file, or something was wrongly configured in an external properties source), then the change management process can be completed, and the properties can be updated. Asynchronous communication can include triggers and notifications being sent asynchronously to refresh the configurations. For example, a production support person and a system reliability person can each independently trigger a notification to the application, letting it know that it needs to read its configuration again, and that is how it is going to recover.

If someone creates a change request to make a change in production, he may be able to track that through the system. So, the system is not just notifying an application, it can also track that the required approvals have been met. It can be a workflow-based trigger. For example, once a user has the approval, knows that it has been tested completely, and can see that status, that is where, during the implementation window a production support person can go ahead and trigger this notification to an application indicating it is time to refresh its properties (e.g., something is wrong).

In some embodiments, the system can be accessed by a particular employer provided role for supporting a production support team. This person may be able to track the change request, and may be able to trigger this notification to an application to notify it to recover from its broken properties.

For example, after a release, the next morning the production support team or application support team may be notified that there was something wrongly configured in the system (e.g., users are not able to connect to the right service or the right URL or are not able to do the right operation). It can be determined whether this is because of a configuration change. If so, the change management process can be triggered by creating: a change order, an urgent change order, or an emergency change order. The steps that need to take place can be described and the change can be allowed to be implemented during a window (e.g., such as after business hours). Rather than having a person initiate that process, steps can be created to update the relevant properties. For example, if the application was reading properties from a database, only steps necessary to update that database with the new configurations can be included. Another parallel thing that may be initiated is to start testing the application in a known, non-production environment, with the configuration changes. Once the test is done, and it is found that the new configuration works, then when the change management process has been completed, the change can be implemented. On an example system, if a user sees the change order approved, then a production support engineer can go ahead and trigger the notification. For example, if a user wants to fix a configuration tonight at 11:00, a production support team member can log into his system, look at the change order, and see that the testing was performed. The production support team member knows that the new properties are going to work, and that the change order was approved. Thus, they can trigger this notification through the system. And the existing application, which is broken, will read this notification, and refresh its configurations on its own (e.g., based on the notification).

In some embodiments, the system may talk with several different applications with a streaming or an enterprise bus, where they publish the notifications or the messages the applications are responsible for reading.

In some embodiments, the system can be centralized: All the configurations for the applications and the changes they are going through can be tracked. In addition, the application can continue to run when it receives a notification from the system and it retrieves the new configuration properties. The application does not need to be recreated, shut down, restarted, etc. Instead, the application can be told it needs to be refreshed, and the refreshing can be done (e.g., as a temporary memory write on a local machine). Notifications can be received, for example, by using a listener on a data stream or on the enterprise bus. For example, if kafka streaming is used, any application that is running can listen to the kafka stream and if they see a notification, they know they need to go refresh their properties.

In some embodiments, because applications can be registered and requests to change those applications can be tracked, notification can be sent to only the system(s) which is broken. Thus, for example, if there are three broken applications, three notifications will be sent to three different systems telling them to read their configurations.

Methods described herein may represent processing that occurs within a system for managing a configuration of an application (e.g., system 100 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors (e.g., processor 610 in FIG. 6) executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Figure 6:
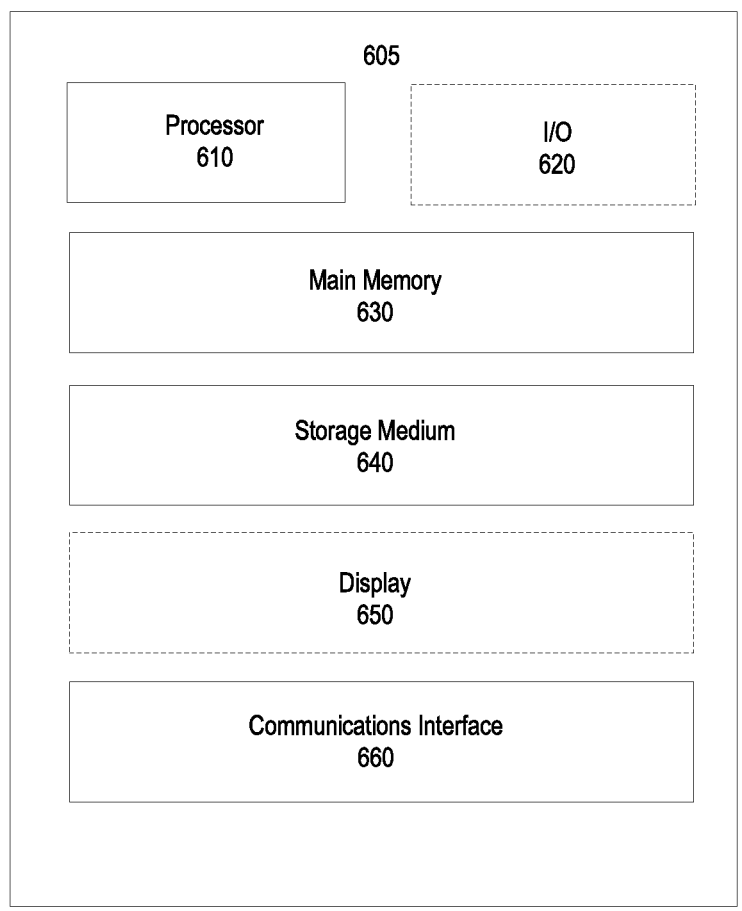
FIG. 6 illustrates an example computer 605, according to some embodiments of the present disclosure.

FIG. 6 illustrates an example computer 605, according to some embodiments of the present disclosure. Computer 605 can include a processor 610 suitable for the execution of a computer program, and can include, by way of example, both general and special purpose microprocessors, and any one or more processor of any kind of digital computer. A processor can receive instructions and data from a memory 630 (e.g., a read only memory or a random access memory or both). Processor 610 can execute instructions and the memory 630 can store instructions and data. A computer can include, or be operatively coupled to receive data from or transfer data to, or both, a storage medium 640 for storing data (e.g., magnetic, magneto optical disks, or optical disks). Information carriers suitable for embodying computer program instructions and data can include all forms of non-volatile memory, including by way of example semiconductor memory devices, such as EPROM, EEPROM, flash memory device, or magnetic disks. The processor 610 and the memory 630 can be supplemented by, or incorporated in, special purpose logic circuitry.

The computer 605 can also include an input/output 620, a display 650, and a communications interface 660.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Accordingly, other implementations are within the scope of the following claims. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

In addition, it should be understood that any figures which highlight the functionality and advantages are presented for example purposes only. The disclosed methodology and system are each sufficiently flexible and configurable such that they may be utilized in ways other than that shown. For example, other steps may be provided, or steps may be eliminated, from the described flows, and other components may be added to, or removed from, the described systems.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method for managing a configuration of an application, comprising:
   identifying a property of the application to update;
   sending a request to update the property to a change management process of a change management environment;
   causing the property of the application to be updated in a test environment;
   identifying that a test of the application with the updated property in the test environment was successful, and that the request was approved by the change management process;
   causing the property of the application to be updated in a database of an application configuration environment after identifying that the test was successful and that the request was approved; and
   triggering a notification to be sent over a network to a computer system executing the application, the notification causing the application to refresh the property by replacing the property with the updated property from the database without restarting or recreating the application in response to a run environment causing the application to retrieve the updated property from the database over the network.

2. The method of claim 1, further comprising:
   causing information about properties of a new application to be stored in the database in response to receiving a request to register the new application.

3. The method of claim 1, wherein the notification is sent over the network via an enterprise bus.

4. The method of claim 1, wherein the computer system is a first computer system, and the change management process is implemented in a second computer system different from the first computer system.

5. The method of claim 4, wherein the database is stored in the second computer system.

6. The method of claim 4, wherein the notification is sent from the first computer system to the second computer system over the network via an enterprise bus.

7. The method of claim 4, wherein the notification includes an address to the updated property, and the first computer system is further configured to retrieve the updated property from the database over the network based on the address.

8. The method of claim 1, wherein the computer system is a first computer system, further comprising:
   automatically causing, by a second computer system, the notification to be sent over the network to the first computer system in response to identifying that the test was successful and that the request has been approved.

9. The method of claim 1, further comprising:
   displaying an indicator that the test of the application with the updated property was successful; and
   displaying an indicator that the request was approved.

10. The method of claim 1, wherein the notification includes an address to the updated property, and the notification causes the application to retrieve the updated property from the database over the network based on the address.

11. A system for managing a configuration of an application, comprising:
    a memory storing instructions; and
    a processor that, when executing the instructions, is configured to:
       identify a property of the application to update;
       send a request to update the property to a change management process of a change management environment;
       cause the property of the application to be updated in a test environment;
       identify that a test of the application with the updated property in the test environment was successful, and that the request was approved by the change management process;
       cause the property of the application to be updated in a database of an application configuration environment after identifying that the test was successful and that the request was approved; and trigger a notification to be sent over a network to a computer system executing the application, the notification causing the application to refresh the property by replacing the property with the updated property from the database without restarting or recreating the application in response to a run environment causing the application to retrieve the updated property from the database over the network.

12. The system of claim 11, wherein the processor is further configured to:

cause information about properties of a new application to be stored in the database in response to receiving a request to register the new application.

13. The system of claim 11, wherein the notification is sent over the network via an enterprise bus.

14. The system of claim 11, wherein the request to update the property is sent over the network to the change management process.

15. The system of claim 11, wherein the notification includes an address to the updated property, and the notification causes the application to retrieve the updated property from the database over the network based on the address.

16. The system of claim 11, wherein the processor is further configured to:

display an indicator that the test of the application with the updated property was successful; and display an indicator that the request was approved.

17. The system of claim 11, wherein the computer system is a first computer system, and the change management process is implemented in a second computer system different from the first computer system.

18. The system of claim 17, wherein the notification includes an address to the updated property, and the first computer system is further configured to retrieve the updated property from the database over the network based on the address.

19. The system of claim 17, wherein the notification is sent from the first computer system to the second computer system over the network via an enterprise bus.

20. The system of claim 11, wherein the computer system is a first computer system that automatically causes, by a second computer system, the notification to be sent over the network to the first computer system in response to identifying that the test was successful and that the request has been approved.

* * * * *